May 19, 1959  D. B. PECK  2,887,649
ELECTRICAL CAPACITORS
Filed Nov. 23, 1953
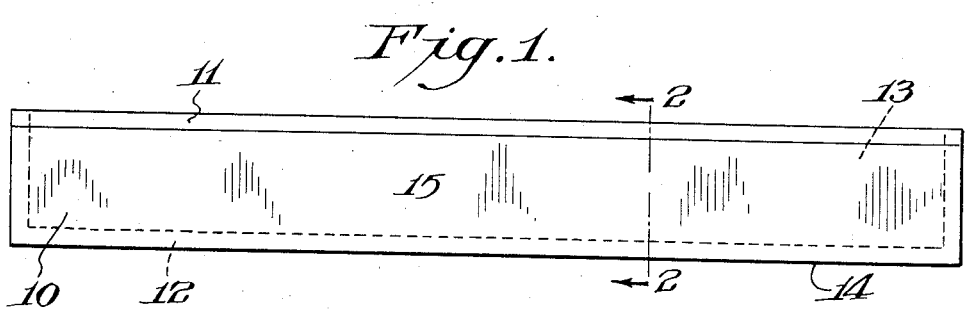
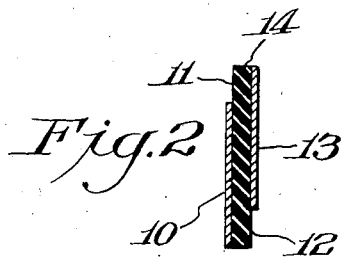
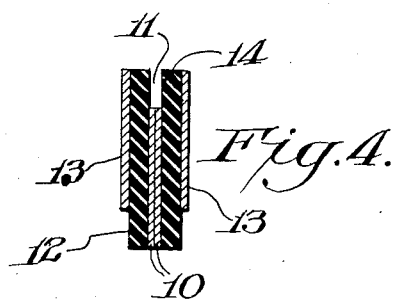
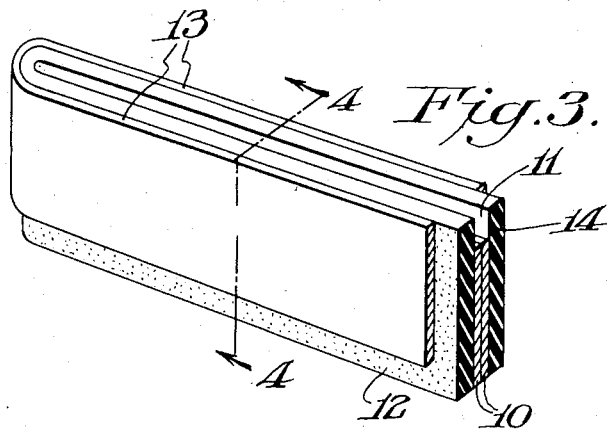
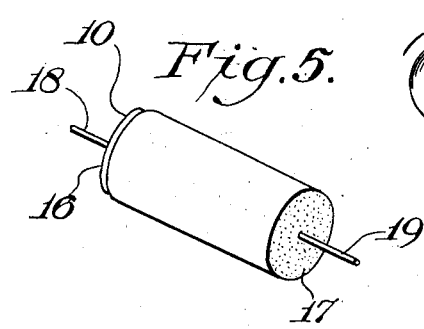
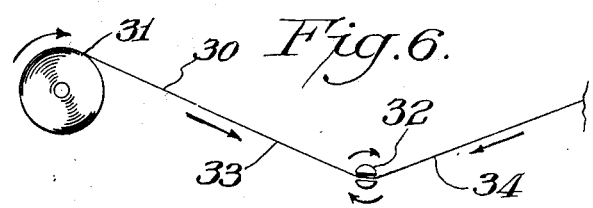
INVENTOR
D. B. PECK
BY
Arthur G. Connolly
ATTORNEY United States Patent Office 2,887,649
Patented May 19, 1959

2,887,649

ELECTRICAL CAPACITORS

David B. Peck, Williamstown, Mass., assignor to Sprague Electric Company, North Adams, Mass., a corporation of Massachusetts Application November 23, 1953, Serial No. 393,673

5 Claims. (Cl. 317—260)

This invention relates to electrical condensers and in particular to wound electrical condensers comprising a single dielectric sheet metallized on both its faces. This is a continuation-in-part of my copending application Serial No. 160,199, filed May 5, 1950 and now abandoned.

Great efforts have been made to produce highly efficient condensers of the ultra-miniature type. It has been found necessary in the past to produce wound condensers having at least two dielectric sheets, each metallized on one face only. Only recently have wound condensers comprising one dielectric sheet metallized on both its faces been produced. A condenser of the latter type is disclosed in United States Patent No. 2,470,826, issued to W. McMahon.

United States Patent No. 2,470,826 discloses a wound electrical condenser comprising a rolled, flexible dielectric sheet with individual metallized coatings on both its faces, a small uncoated margin being provided around the edges of each face of the sheet, the thus metallized sheet is folded lengthwise along its center line and rolled, a similar number of terminal tabs being secured to each electrode of the winding. (Alternatively, the terminal tabs may be wound into the condenser section with the metallized sheet.) This structure is not satisfactory for a number of reasons. The structure disclosed by McMahon requires complex production methods in that the operation must precisely fold the dielectric sheet along its midpoint and while doing so avoid injury of the metallized coating, which avoidance is virtually impossible. The rolling of McMahon's sheets results in an intolerable percentage of units having excessive bulkiness. Condenser sections completed in accordance with the patent have high inherent inductance and therefore are not useful at high frequencies. Other considerations are that this necessitates tabs with their disadvantages, excessive injury to the dielectric by the lengthy fold and finally non-competitive costs of production arising out of the above difficulties.

It is the object of this invention to overcome the foregoing and related disadvantages. Another object of this invention is to produce a convolutely wound metallized condenser having low inherent inductance, high efficiency, and good high frequency characteristics. It is still another object of this invention to produce a readily manufactured, wound condenser comrising only one flexible dielectric sheet metallized on both its faces. Still further objects of this invention will become apparent from the description and claims that follow.

These objects are attained in accordance with the present invention wherein there is produced an electrical condenser comprising a single flexible, dielectric sheet having a metallized coating on each of its faces, said sheet being folded at about its midpoint along a line perpendicular to its length and folded sheet being convolutely wound, and terminals being provided in electrical contact with the metallized coatings. It may be desirable, in order to increase the voltage breakdown potential of condenser sections made in accordance with the present invention, to provide non-metallized margins along one or more edges of one or both faces of the single dielectric sheet.

In another embodiment this invention is concerned with an electrical condenser as herein disclosed wherein both faces of the dielectric sheet have a lacquer overcoat thereon (the term "lacquer" as used herein refers to a dielectric resin). The lacquer overcoat is preferably applied to the dielectric sheet prior to the metallization thereof. In still another sense this invention is concerned with the herein disclosed condenser wherein the terminals are secured to the respective exposed edges of the metallized coatings by means of a sprayed metallized end coat. In a further sense this invention is concerned with the herein disclosed condenser wherein metallized aluminum or zinc coatings are employed on the faces of the dielectric sheet. The invention will be further described with reference to the appended drawings in which Fig. 1 is a plan view of a dielectric sheet, in accordance with one embodiment of the present invention;

Fig. 2 is an end view taken on the line 2—2 of Fig. 1 showing the metallized coatings on each face of the sheet;

Fig. 3 is a perspective view showing the folded metallized dielectric sheet of Fig. 1;

Fig. 4 is a sectional view taken on the line 4—4 of Fig. 3 showing the relative position of the various elements after folding the metallized dielectric sheet;

Fig. 5 is a perspective view showing the complete convolutely wound condenser section ready for potting or housing;

Fig. 6 shows, diagrammatically, one method of winding a condenser section in accordance with the present invention.

In order that the invention may be more clearly described, each element has been given the same numerical designation in each of the Figures 1 through 5 inclusive. It is to be clearly understood that the drawings represent only one of the preferred embodiments of the invention.

Referring more particularly to Figs. 1 and 2 of the drawings, dielectric sheet 14 is coated on both its faces with metallized coatings 10 and 13 except for the non-metallized margins 11 and 12, respectively. As shown, non-metallized margin 12 preferably extends along three edges of one face of dielectric sheet 14. The other margin 11 preferably extends along only one edge of the other face of dielectric sheet 14. This arrangement is desirable since it decreases the opportunity for voltage breakdown along the edges of the condenser section. The metallized dielectric sheet 15 is then folded at its midpoint along a line perpendicular to its length as shown in Fig. 3. Fig. 4 shows in cross-section the relative position of the various elements after folding. The folded metallized dielectric sheet of Fig. 3 is then convolutely wound as shown in Fig. 5, the terminal leads 18 and 19 are then secured to the respective exposed edges of the metallized coatings 10 and 13 by means of metallic end coats 16 and 17, respectively, applied as by spraying.

This manner of folding in addition to overcoming the deficiencies of the McMahon device productionwise has been found to increase the operating life of the metallized subminiatures. It is believed that the lengthy crease of the McMahon construction results in sufficient injury to the dielectric and/or film that in the self-healing step sufficient amounts of degradation products arising from the self-healing have occurred that the life time of the units is materially reduced. In contrast with this, my technique results in only minor amounts of injury to the metallized film and/or dielectric sheet, which injury apparently is not sufficient to perceptibly affect the life time of the units. Additionally, in the commercial production of these structures of my invention, one method of which is indicated in Fig. 6, the insertion of the mandrel on the metallized dielectric sheet results only in gentle folding of the metallized dielectric sheet which need not be compressed after final assembly so it does not have any derogatory effect as indicated. In contrast with my procedure the McMahon structure must substantially and materially crease the dielectric so as to avoid excessive bulkiness.

Fig. 6 illustrates, diagrammatically, one method of winding the condenser sections of the present invention. A foil 30, coated on each of its faces with a metallic layer, such as layers 10, 13 in Fig. 1, or any suitable variation thereof, is held on a spool 31. The free end of the foil is drawn through a winding mandrel 32 until two about equal lengths of foil 33, 34, are unrolled. Next the mandrel is rotated. If, as shown in Fig. 6, mandrel 32 is rotated in a clockwise direction, spool 31 is also rotated clockwise and foil portion 33 is moved to the right toward mandrel 32. Simultaneously, foil portion 34 is moved to the left toward mandrel 32. This results in an automatic, simultaneous winding and folding operation. After foil portion 34 has been completely wound into the condenser section, foil portion 33 may be detached from spool 31 by a simple cutting operation and the completely wound section may then be removed from mandrel 32. The same procedure may be repeated to produce a number of condenser sections. In order to increase the safe operating breakdown voltage of the condenser sections, it is desirable that the electrodes be sparked at or above the condenser operating voltage directly before or after winding of the sections. Non-metallized margins may or may not be provided along each face of the dielectric sheet in accordance with the circuit operating conditions to be met.

The elements of this novel metallized convolutely wound condenser may be composed of various appropriate materials, the composition of which is not critical. The dielectric sheet may be comprised of such materials as kraft paper, ethyl cellulose, cellulose nitrate, cellulose acetate, regenerated cellulose, polystyrene, polyethylene, polytrifluoroethylene, polytrifluoromonochloroethylene, polypentacholorostyrene, polyurethanes, polyesters, polyamides, polyvinyl alcohol, etc.

The surfaces of the dielectric under some conditions may be covered as with a lacquer overcoat of such materials as cellulose nitrate, cellulose acetate, methyl cellulose, polystyrene, polyethylene, and cellulose acetate-butyrate.

Such metals as aluminum, zinc, copper, lead, or silver may readily be used for the metallized plates of the condenser.

It is to be understood, of course, that this invention is not to be limited to the materials herein disclosed.

In addition to the sprayed metallized terminal end coats described herein, the condenser section may be terminated in solderable metal end caps or by other suitable means that will provide electrical contact with the respective metallized edges of the condenser winding. It is to be noted that the possible methods of terminating my condenser electrodes does not include the imposed tab manner of McMahon. It has been found that the tab connections are extremely disadvantageous in that high current densities occur in the region of the metallized film adjacent to the tabs and result in substantial damage to the film upon operation which is evidenced by excessive power factors. The completed condenser section may be suitably housed in a heat and pressure molded, or cast resin, housing or it may be enclosed in a wax seal or a glass tubular casing with suitable metal end closures. The condenser sections herein disclosed are ordinarily impregnated with an oil, wax or resin.

The novel metallic condenser herein disclosed is especially adapted to the ultra-miniature field. The unique structure disclosed provides an excellent highly efficient, low voltage, high frequency, non-inductive condenser of extremely small physical size. Other advantages of my invention include the ability to construct a subminiature component with relative ease of production, is much more compact than the comparable McMahon embodiment and does not suffer from short operational life and high rate of production reject rising out of extended folding of the dielectric film.

As many apparently widely different embodiments of this invention may be made without departing from the spirit and scope hereof, it is to be understood that the invention is not limited to its specific embodiments except as defined in the appended claims.

What is claimed is:

1. An electrical condenser comprising a single flexible elongated dielectric sheet having a metallized coating on each of its faces, the coating on one face covering substantially the entire area thereof except for an unmetallized margin on one longitudinal edge of said sheet, the coating on the other face covering a similar area with an unmetallized area at the opposite longitudinal edge of said sheet, said sheet being folded about its midpoint along a line perpendicular to its length into inner and outer sections, and convolutely wound a plurality of times about an axis parallel to its fold line, said inner section being wound on the inside of said outer section, and said inner section extending in the wound unit at least as for as said outer section, but not further than one turn more than said outer section, and terminals in electrical contact with the respective metallized coatings.

2. An electrical condenser comprising a single flexible elongated dielectric sheet having a metallized coating on each of its faces, said sheet being folded in the region of its midpoint along a line perpendicular to its length into inner and outer sections, and convolutely wound a plurality of times about an axis parallel to its fold line, said inner section being wound on the inside of said outer section, and said inner section extending in the wound unit at least as far as said outer section, but not further than one turn more than said outer section, and terminals in electrical contact with the respective metallized coatings.

3. The condenser of claim 2 wherein one coating has an edge extending along one side edge of the sheet, the other coating has an edge extending along the other side edge and the terminals are secured to the respective edges of the metallized coatings by means of sprayed metallized end coats contacting substantially the entire lengths of said edges.

4. An electrical condenser comprising a single flexible elongated dielectric sheet having a metallized coating on each of its faces, said sheet being gently folded in the region of its midpoint along a line perpendicular to its length into inner and outer sections, and convolutely wound a plurality of times about an axis parallel to its fold line, said inner section being wound on the inside of said outer section, and said inner section extending in the wound unit at least as far as said outer section, but not further than one turn more than said outer section, and terminals in electrical contact with the respective metallized coatings.

5. The wound condenser unit of claim 2 in which there is an uncompacted zone at the fold in the center of the unit where the winding begins.

References Cited in the file of this patent

UNITED STATES PATENTS

| | | |
|---|---|---|
| 1,395,931 | Smith | Nov. 1, 1921 |
| 2,367,152 | Strab | Jan. 9, 1945 |
| 2,416,540 | Nordberg | Feb. 25, 1947 |
| 2,470,826 | McMahon | May 24, 1949 |
| 2,506,314 | Nordberg | May 2, 1950 |

FOREIGN PATENTS

| | | |
|---|---|---|
| 563,407 | Britain | Aug. 14, 1944 |
| 619,364 | Britain | Mar. 8, 1949 |
| 829,632 | Germany | Jan. 28, 1952 |